Jan. 12, 1960 R. C. ZEIDLER 2,920,731
FRICTION CLUTCH
Filed June 28, 1956 3 Sheets-Sheet 1
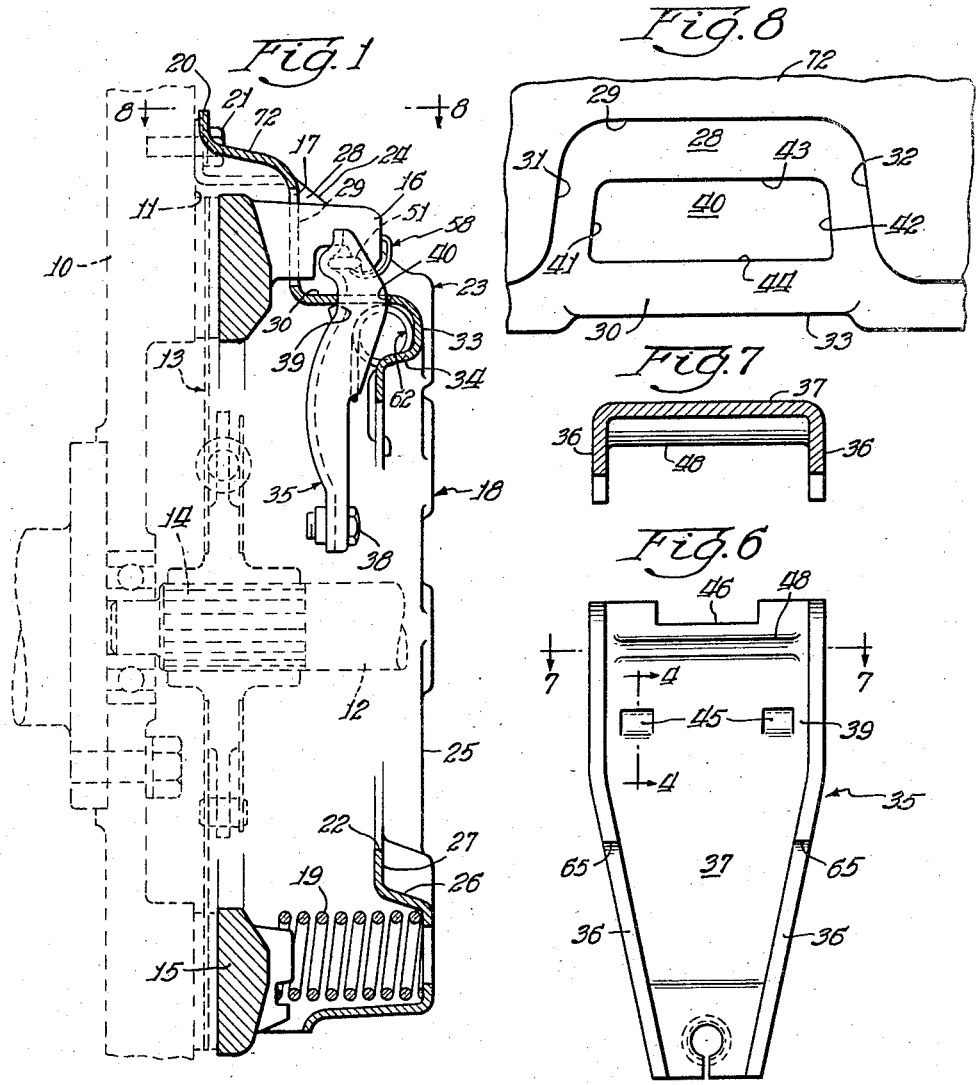
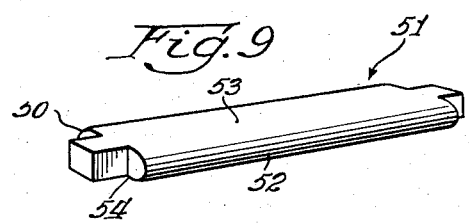
Inventor:
Reinhold C. Zeidler
By: H. J. Schmid Atty.

Jan. 12, 1960

R. C. ZEIDLER 2,920,731

FRICTION CLUTCH

Filed June 28, 1956

Inventor:
Reinhold C. Zeidler
By: H. J. Schmid Atty.

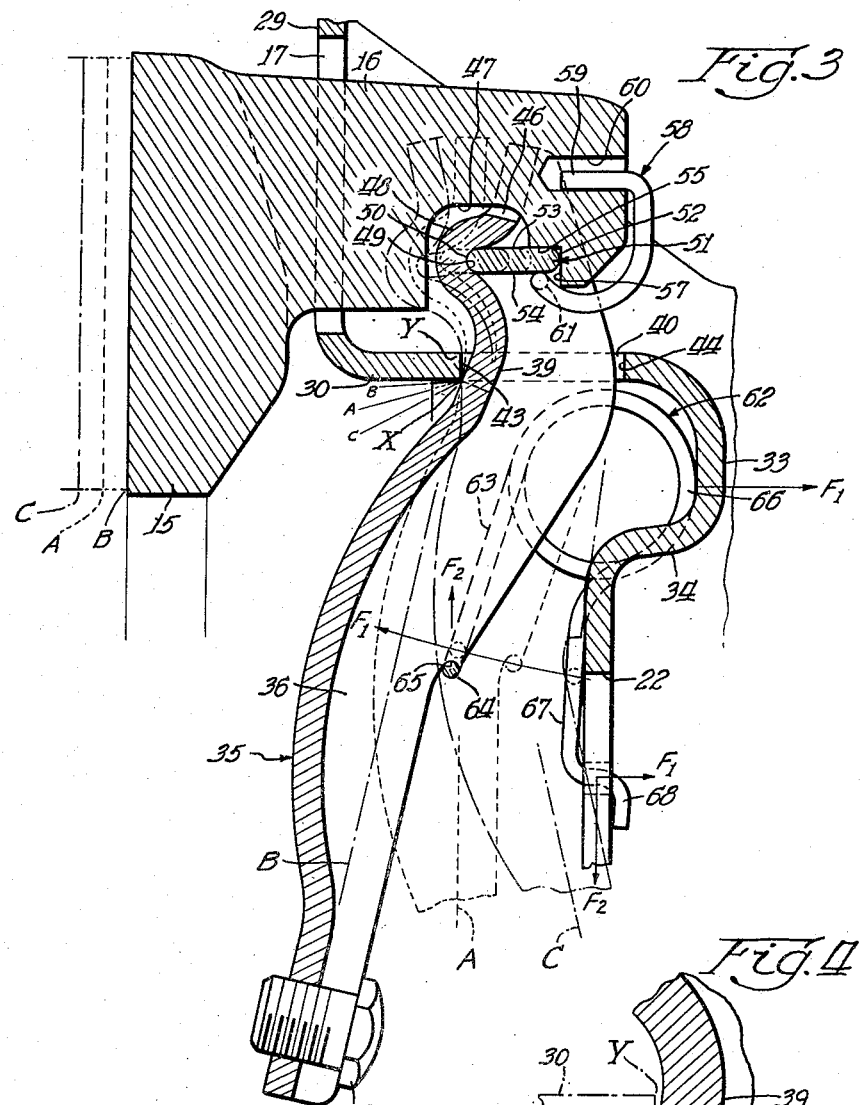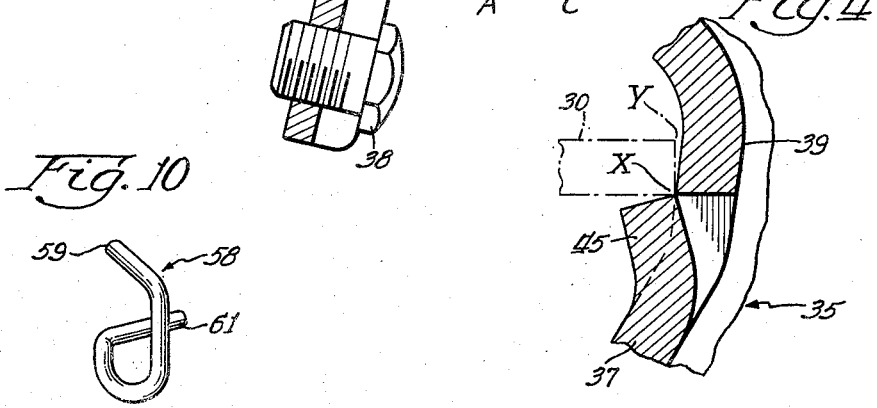

United States Patent Office 2,920,731
Patented Jan. 12, 1960

2,920,731
FRICTION CLUTCH

Reinhold C. Zeidler, Detroit, Mich., assignor to Borg-Warner Corporation, Chicago, Ill., a corporation of Illinois Application June 28, 1956, Serial No. 594,485
2 Claims. (Cl. 192—68)

This invention relates to a friction clutch of the type employed in motor vehicles.

An object of the invention is to provide an improved friction clutch of simple, inexpensive and lightweight construction and having a high degree of efficiency in operation.

Another object of the invention is to provide a simple and economical improved clutch construction including a pressure plate, a stamped sheet metal cover plate, stamped sheet metal levers connected to and fulcrumed on the cover plate and operatively associated with the pressure plate to operate the pressure plate, and a plurality of springs holding the levers in assembly with the cover and pressure plates.

Another object of the invention is to provide an improved clutch including a cover plate supporting a plurality of clutch-control levers engaging a pressure plate, and having spring-supporting portions for retaining springs holding the levers in assembly with the cover plate and in operative relation to the pressure plate, the pressure plate having drive lugs extending through openings in the cover plate and connected by struts to the levers operating the pressure plate.

Another object of the invention is to provide an improved clutch lever assembly wherein the levers are formed with fulcrum portions located closely adjacent to the pressure plate actuating portions of the levers to obtain maximum lever ratios during operation of the levers, the fulcrum portions of the levers being provided by tongues projecting from the levers for pivotally supporting the levers on edges of slots in the cover plate through which the levers extend.

A further object to provide an improved lever-mounting means comprising a cover plate with an opening partly defined by a radially extending wall with inner and outer knife edges, and a lever disposed in the opening and having spaced projections positioning the lever to have line contact with the radially inner knife edge of the wall during a substantial portion of the wear life of the engaging clutch plates and, thereafter, upon increasing wear of the plates, the lever contact with the cover plate transferring to substantially flat-face engagement with the wall and, upon further wear, the lever has line contact with the outer knife edge of the wall; under these conditions, the levers fulcruming on the inner edge of the wall during completion of the movement of the levers to disengage the clutch.

A further object of the invention is to provide an improved lever assembly as described wherein the lever is maintained in fulcruming engagement with the cover plate by a torsion spring disposed in a novel manner between the lever and cover plate, and wherein the centrifugal force, acting on the lever, is resisted by the lever projections engaging the cover plate.

A still further object of the invention is the provision of a cover plate having a lever-receiving slot provided with tapered sides for the purpose of confining the lever to position the point of contact of the sides with the lever as close as possible to the fulcrum portion of the lever to minimize friction.

Additional objects, aims, and advantages of the invention, contemplated herein will be apparent to persons skilled in the art after the construction and operation of the clutch assembly is understood from the following description. It is preferred to accomplish the objects of this invention, and to practice the same in substantially the manner hereinafter fully described and as more particularly pointed out in the appended claims. Reference is now made to the accompanying drawings forming a part of the specification.

In the drawings:

Fig. 1 is a central axial section of a clutch assembly of the present invention, the view being taken substantially of the line 1—1 of Fig. 2 and showing the relative positions of the clutch parts during engagement of the clutch;

Fig. 3 is an enlarged fragmentary view of the clutch shown in Fig. 1, illustrating the pressure plate, cover plate and associated parts, during different clutch operations indicated in full and dotted lines;

Fig. 4 is a sectional view of the lever shown in Fig. 1 and illustrating, in greater detail, the fulcrum engagement of the lever with the cover plate;

Fig. 6 is an elevational view of the lever;

Fig. 7 is a sectional view of the lever, taken on line 7—7 of Fig. 6;

Fig. 8 is a view of a fragmentary portion of the cover plate taken on line 8—8 of Fig. 1 and illustrating the formation of the lever-receiving opening in the plate;

Fig. 9 is a perspective view of the strut shown in Figs. 1, 2, 3, and 5; and

Fig. 10 is a perspective view of the wire clip shown as engaging the strut in Figs. 1, 2, 3, and 5.

The drawings are to be understood as being more or less of a schematic character for the purpose of disclosing typical or preferred forms of the improvements contemplated herein, and in these drawings like reference characters identify the same parts in the several views.

Figure 2:
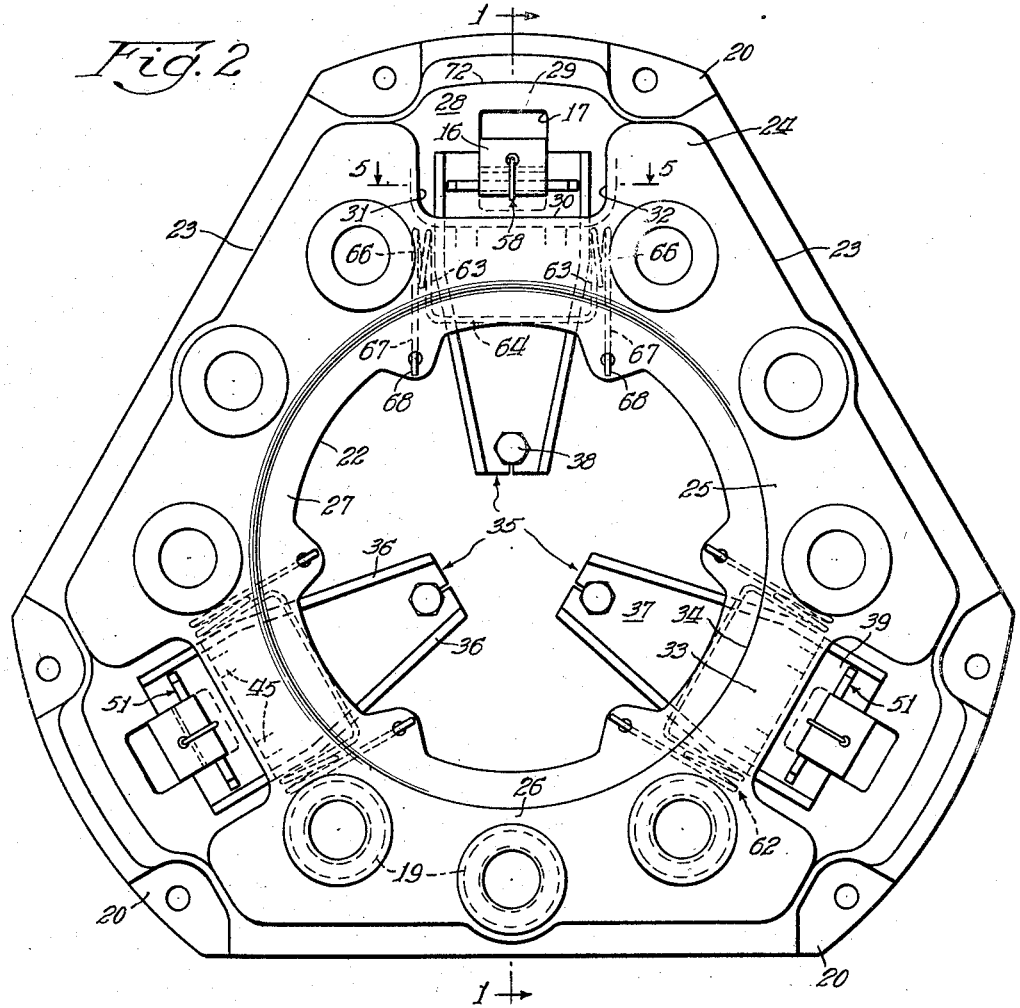
Fig. 2 is a plan view of the clutch shown in Fig. 1, looking at the clutch from the rear.

Referring to the drawings, and particularly to Figs. 1 and 2, the clutch assembly includes a flywheel 10 having a clutch face 11, a transmission or output shaft 12, a driven clutch disc indicated generally at 13 and secured upon the splined end 14 of the transmission shaft 12, and a pressure plate 15 having drive lugs 16 extending within openings 17 in a cover plate 18 secured to the flywheel 10. A plurality of coil springs 19 are disposed between and have their opposite ends engaging the cover plate and the pressure plate to normally urge the pressure plate into engagement with the driven clutch disc 13 to effect engagement of disc 13 with the flywheel 10 and the pressure plate 15 to transfer drive from the flywheel 10 to the driven shaft 12. The flywheel 10 transmits drive to the cover plate 18 which, through its connection to the pressure plate 15, rotates the pressure plate 15. The drive lugs 16 of the pressure plate, positioned within the openings 17 in the cover plate 18, engage opposite sides of the openings 17 to provide a driving connection between the cover plate and the pressure plate, while permitting movement of the pressure plate axially of the cover plate.

The cover plate 18 is preferably a heavy sheet metal stamping comprising a body portion of dish-shaped section and an outwardly flared flanged marginal portion including attaching flanges 20 secured to the flywheel 10 by bolts 21. The central portion of the cover plate has a circular opening 22 of sufficient size to provide clearance for the driven shaft 12 and other instrumentalities of the clutch mechanism.

The cover plate is of polygonal shape of somewhat triangular form having sides of chordal portions 23 separated by the flanges 20 lying in a common plane and attached to the flywheel. Each chordal portion 23 is formed of an arch of arcuate shape to bridge the pressure plate 15 and comprises a wall 24 angularly inclined to a radial plane intersecting the axis of the plate and extending from the flanged marginal portion to the rear or bottom wall 25 of the cover plate, the wall 25 extending radially inwardly and merging with an angularly inclined wall 26 connected to a radially inner wall 27 having its peripheral edge defining the opening 22.

A wall 72 is provided with a plurality of pockets 28, each pocket being defined by angularly disposed respectively radially and axially extending flat walls 29 and 30 merging with side walls 31 and 32, the wall 29 merging with the inclined wall 72 and the wall 30 merging with a radially extending wall 33, connected to the radially inner and extending wall 27 by an axially extending wall 34.

The rear wall 25 of the cover plate provides seats for the springs 19 engaging and compressed between the seats and the pressure plate for normally urging and holding the pressure plate in engagement with the driven plate to provide a driving connection between the flywheel and the driven shaft. It will be noted by an inspection of Figs. 1 and 2 that the walls 29 of the pocket portions of the wall 72 are provided with the substantially square openings 17 for receiving the lugs 16 on the pressure plate, the radially extending side edges of the walls 29 partly defining the openings 17 and engaging the sides of the lugs to transmit drive from the cover plate to the pressure plate while allowing axial movement of the pressure plate.

The clutch is provided with a plurality of control lever assemblies supported on the cover plate and engaging the pressure plate to move the pressure plate axially toward the cover plate, against the pressure of the springs 19 to disengage the pressure plate from the driven disc assembly and thereby release a driving connection between the flywheel and the driven shaft.

Each of these lever assemblies comprises a lever 35 formed as a sheet metal stamping and generally channel-shaped in cross-section to provide re-enforcing side flanges 36, 36 at opposite sides of the body portion 37 of the lever and converging radially inwardly of the lever. The body portion of the lever has its radially inner extremity provided with an adjusting bolt 38 therein engageable with a release collar (not shown), and the lever body portion extends radially outwardly to an angularly offset fulcrum section 39 (Figs. 1, 3, 4, 6) extending through an opening 40 of frusto-conical shape (Fig. 8) in the wall 30 of the cover plate, the sides 41 and 42 of the opening 40 being angularly inclined to each other to converge toward the front of the clutch for a purpose to be later described. The other sides 43 and 44 of the opening 40 are parallel to each other as shown in Fig. 8. The fulcrum portion 39 of each lever is provided with a pair of projections or tongues 45 spaced an equal distance from the adjacent side flanges 36, 36 and disposed radially inwardly of an engaging wall 30 of the cover plate to prevent radially outward movement of the lever under the influence of centrifugal force and to perform other functions to be described hereinafter. The release lever derives its main strength from the side flanges 36, 36 and, therefore, the tongues 45, sheared from the lever body portion, provide efficient positioning means without deducting materially from the strength and without loss of contact surface where the release lever engages and has line contact with the knife edge fulcrum defined by the radially inner end of the side or wall 43 of the opening 40 of the cover plate. The radially outer end of each lever is preferably recessed at 46 by terminating the body portion inwardly of the flanges 36, 36 so that the recess in the lever and between the flanges 36, 36 receives a lug 16 on the pressure plate.

Figure 5:
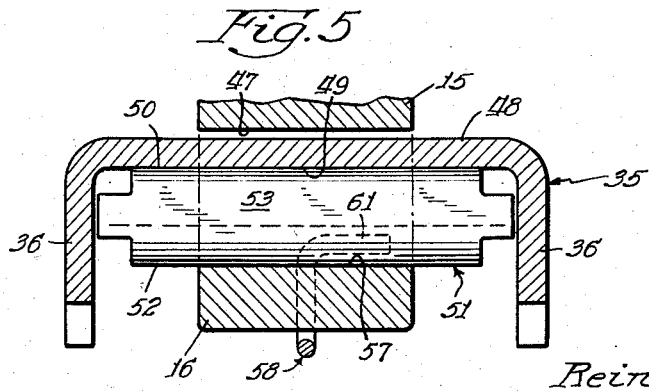
Fig. 5 is a sectional view taken as indicated on the line 5—5 of Fig. 2 and showing an enlarged fragmentary portion of the pressure plate, the lever, and the strut disposed between the lever and pressure plate.

The body portion of the lever extends into a slot 47 in the lug 16 of the pressure plate and adjacent the recess 46 in the lever, and the lever is upset to provide a transverse arcuate rib 48 extending between and merging with the side flanges 36, 36 of the lever, the rib having an arcuate face 49 contacting a complementary surface 50 on a strut 51. The strut 51 is shown in Fig. 9 and comprises a comparatively thin elongate bar having arcuate edge faces 50 and 52 and flat sides 53 and 54, the ends of the bar being reduced and engaging the side flanges 36, 36 of the lever as seen in Fig. 5. In Fig. 3, the side 53 of the strut abuts a shoulder 55 on the lug 16 of the pressure plate 15 and has its arcuate face 53 seated against a flat wall 57 on the lug. A retaining spring clip 58 (Figs. 3, 5, and 10) has one end 59 positioned within an opening 60 in the pressure plate lug 16, the clip being bent to be disposed about the terminal portion of the lug to position the other end 61 of the clip to underlie and engage the face 54 of the strut and its sole function is to retain the strut in assembly with the lug and lever to prevent accidental dislodgment of the strut if the clutch lever is accidentally bumped when assembling the transmission, using the clutch, to the engine. During normal operation, centrifugal force maintains the strut in its proper operating position.

Each lever is held in position on the cover plate by the tongues of the levers engaging the cover plate, and by a spring 62 effective to maintain the lever in position on the cover plate and in operative relation to the pressure plate. More particularly, the spring 62 is of substantially U-shape, as seen in Fig. 2, to straddle the lever and includes a pair of spaced arms 63, 63 connected by a cross piece 64 positioned within notches 65 in the side flanges of the lever, the spring having coils 66, 66 at the outer portions of the arms and a pair of arms 67, 67, the arms 67, 67 terminating with reversely bent S-shaped hooks 68, 68 at their extremities, portions of the hooks extending through openings in the radially inner edge of the cover plate defining the central opening 22 therein and engaging the edge, as shown in Figs. 2 and 3. The spring coils 66, 66 are compressed by the ends of the arms 67, 67 engaging the cover plate, and the cross piece 64 engaging the levers, to provide a suitable tension of the spring in the assembly of the clutch, with the tension of the spring being effective to eliminate slack in the parts and varying only slightly during operation of the lever. It is contemplated that three lever assemblies be used with the clutch and nine coil springs 19 so that the springs 62 cannot, in any way, effect the thrust spring loading of the clutch.

It will be apparent from an inspection of the drawings that each spring 62, in its assembly with the cover plate and the lever, will cause the coils of the spring to be compressed to an extent that the arms 63, 63 and 67, 67 of the spring will have the coil pressure applied to them to move the arms 63, 63 apart from the arms 67, 67 with the result that the resultant tension will cause the arms 67, 67 to be flexed to insure the S-shaped portions, at the extremity of these arms, to firmly engage the cover plate, with the active force of the coils being exerted upon the arms 63, 63 and cross piece 64 to provide a force attempting to move the lever radially outwardly but which will be prevented by the engagement of the tongues 45, 45 on the levers with the cover plate.

It will be seen from an inspection of Fig. 3 that the radially inner edge of the opening 40 in the cover plate wall 30, at the juncture of the right angularly disposed surfaces of the side 43 of the opening and the wall 30, has a line contact with the lever to provide the knife edge fulcrum X around which the lever can rotate and against which it is constantly held by the tension of the spring 62. The spring 62 exerts force to rotate the lever in a clock-wise direction about the fulcrum, as seen in Figs. 1 and 4. Thus, the spring is effective to hold the lever in operative assembly with the cover plate and pressure plate.

More particularly, the purpose of this spring is to maintain load on the lever to prevent rattle, to keep the strut under load, to resist tendency for the lever to back up against the throw-out bearing on release collar, and to prevent the levers moving inwardly when they are released. Taking advantage of the normal line of travel of the looped end of the spring, the shoulders 65, 65 in the two side flanges 36, 36 of the lever have been arranged in such a manner as to put the spring in tension when the levers are released. In the engaged position, there is little or no tension on the loop of the spring and the load of the spring is exerted in a direction indicated by $F_1$ (Fig. 3). However, upon release of the clutch, the unwinding action of the spring has the effect of causing the loop of the spring to move radially outward thereby setting up a force in a direction indicated as $F_2$. The reaction of the spring in the cover stamping is indicated by the direction and forces of $F_1$ and $F_2$. It will be apparent that, upon movement of the radially inner end of the lever towards the flywheel 10, the lever will rotate about the fulcrum X on the cover plate and, as the lever will move in a clockwise direction, the rib 48 of the lever, engaging the strut 51, seated against the pressure plate, will move the strut in a direction to force the pressure plate in an axial direction away from the driven clutch disc 13 and against the pressure of the springs 19 to release the pressure plate from the driven disc and to disengage the clutch.

Referring to the operation of the clutch and particularly to the lever arrangement therefor (Fig. 3), the clutch packing springs 19 are normally operative between the cover plate and pressure plate to cause the pressure plate 15 to effect engagement of the driven plate 13 with the pressure plate and the flywheel 10, with the release lever mechanism being positioned as shown in Fig. 1. To release engagement of the driven plate from the pressure plate and flywheel, the radially inner ends of the levers are urged toward the pressure plate by a conventional release bearing (not shown) encircling the driven shaft 12, and the levers will rotate about the knife edge fulcrum X on the cover plate to move the outer ends of the levers and thereby the struts rearwardly of the clutch. As the engaged surfaces of the struts and levers are arcuately complemental, the movement of the struts is effected by a rolling action afforded by these surfaces, and, as the other arcuate surfaces of the struts engage flat surfaces on the pressure plate lugs, the movement of the struts, at these latter engaged surfaces thereof and the lugs, will be with a rolling action combined with a sliding action and be effective to move the pressure plate out of engagement with the driven plate, the position of the parts being shown in Fig. 3.

It will be apparent that the lever arrangement is designed to permit clutch operation with a minimum of friction and without appreciable wear of the parts as evidenced by the knife edge contact between the lever and cover plate, and the strut action between the lever and pressure plate. In addition, the tapered sides of the slot 40 in the cover plate 18 (Fig. 8) receiving the lever are effective to minimize scrubbing action as the point of contact with the lever is as close as possible to the knife edge fulcrum X for the lever.

Figure 3 shows various positions of the lever arrangement which occur during wear of the engaging surfaces of the friction linings conventionally employed with the driven plate. More particularly, position A illustrates the parts of the lever system during clutch engagement, and position B illustrates the parts during operation thereof to release the clutch. The positions A and B of the parts of the lever system are maintained until the friction linings of the driven plate are worn about 50 percent at which time the furcrum point of contact of the lever with the cover plate, in the engaged position of the clutch, has transferred from the point X at the inner edge of the cover plate wall 30 to the point Y at the outer edge of the wall 30, as shown by position C of the lever in Fig. 3. However, this rate is very slow and proportionate to the rate of wear of the friction linings of the driven plate.

An important feature of the present invention is the location of the fulcrum point X for the lever on the cover plate closely adjacent to the pressure plate drive lugs to obtain a maximum lever ratio during operation of the levers in retracting the pressure plate.

While this invention has been described in detail in its preferred form or embodiment, it will be apparent to persons skilled in the art, after understanding the improvements that various changes and modifications may be made therein without departing from the spirit or scope thereof. It is aimed in the appended claims to cover all such changes and modifications.

I claim:

1. In a clutch assembly, a drive plate; a driven plate having friction facings; a pressure plate having a friction face on one side thereof and disposed radially of the axis of said clutch assembly, and having axially extending lugs projecting from the other side thereof and provided with slots; an annular cover plate connected to said drive plate and having outer radially extending portions merging with inner axially extending portions thereof, said radially extending portions having openings therein receiving said lugs for drivingly connecting said pressure and cover plates and for axial movement of said pressure plate relative to said cover plate, said axially extending portions having openings therein radially inwardly of said lugs with each opening having one terminal portion thereof defined by axially extending surfaces connected by a radially extended surface affording radially inner and outer knife edges at the junctures of said radially extending surface with said axially extending surfaces, each of said openings being defined by side edges tapered towards said knife edges; a plurality of coil springs compressed between said cover plate and pressure plate and urging said pressure plate into engagement with said driven plate; and a plurality of stamped sheet metal release levers within said cover plate extending radially outward through said openings in said axially extending portions of said cover plate into the slots of said pressure plate lugs and each lever being of U-shaped cross-section defining a body portion and longitudinal side flanges, the body portions of the levers having spaced projections thereon engaging the radially inner knife edges of said terminal portions to fulcrum said levers on said cover plate, each of said levers being operative to rotate about the engaged terminal portion of said opening in the cover plate to shift its fulcruming engagement with said cover plate from the radially inner knife edge to the radially extending surface and then to the radially outer knife edge, upon increasing wear of the friction facings of said driven plate.

2. In a clutch assembly as defined in claim 1 wherein a plurality of tension springs are connected to said levers and to said cover plate, each spring having spaced pairs of legs connected by a coil, one pair of said legs being connected to the radially inner edge of said cover plate, and a crosspiece connects the other pair of legs and extends within notches of said lever flanges and urges said lever outwardly into fulcruming engagement with said terminal portion of said cover plate opening.

References Cited in the file of this patent

UNITED STATES PATENTS

| | | |
|---|---|---|
| 2,164,544 | Reed | July 4, 1939 |
| 2,219,139 | Nutt et al. | Oct. 22, 1940 |
| 2,468,685 | Nutt et al. | Apr. 26, 1949 |
| 2,601,912 | Reed | July 1, 1952 |

FOREIGN PATENTS

| | | |
|---|---|---|
| 847,057 | France | June 26, 1939 |